United States Patent [19]

Braungart

[11] E Patent Number: Re. 32,903

[45] Reissued Date of Patent: Apr. 11, 1989

[54] MOTOR VEHICLE WHEEL CENTER INCLUDING AN ANTI-THEFT FEATURE

[75] Inventor: Martin Braungart, Alpirsbach, Fed. Rep. of Germany

[73] Assignee: BBS Kraftfahrzeugtechnik, GmbH and Co. KG., Schiltach, Fed. Rep. of Germany

[21] Appl. No.: 939,512

[22] Filed: Nov. 13, 1986

Related U.S. Patent Documents

Reissue of:

[64] Patent No.: 4,544,209
Issued: Oct. 1, 1985
Appl. No.: 575,011
Filed: Jan. 30, 1984

[30] Foreign Application Priority Data

May 27, 1983 [EP] European Pat. Off. ..... 83105259.2

[51] Int. Cl.[4] ..... B60B 7/02; B60B 1/00

[52] U.S. Cl. ..... 301/37 AT; 301/37 SC; 301/108 SC

[58] Field of Search ..... 301/37 AT, 37 SC, 108 SC, 301/37 R, 37 P, 37 CM, 37 SS, 108 R, 108 S

[56] References Cited

U.S. PATENT DOCUMENTS

| | | | |
|---|---|---|---|
| 2,282,222 | 5/1942 | Goeske | 301/37 |
| 2,906,558 | 9/1959 | Forbush | 301/108 SC X |
| 2,911,260 | 11/1959 | Lyon | 301/37 |
| 3,170,733 | 2/1965 | Lamme | 301/37 |
| 3,995,461 | 12/1976 | Hudson | 70/225 |
| 4,067,621 | 1/1978 | Reppert | 301/108 A |
| 4,083,606 | 4/1978 | Scruggs | 301/37 AT |

FOREIGN PATENT DOCUMENTS

| | | | |
|---|---|---|---|
| 3007911 | 9/1981 | Fed. Rep. of Germany | 301/37 R |
| 3233918 | 3/1984 | Fed. Rep. of Germany | 301/37 R |
| 3233802 | 3/1984 | Fed. Rep. of Germany | 301/37 AT |
| 640092 | 7/1928 | France | 301/37 SC |
| 327315 | 4/1930 | United Kingdom | 301/37 SC |

OTHER PUBLICATIONS

Remotec Wheel Catalog (Undated) entitled, "Perfect Technology with the Finest Style".

*Primary Examiner*—James B. Marbert
*Attorney, Agent, or Firm*—Dick and Harris

[57] ABSTRACT

An improved motor vehicle wheel center for providing a virtually continuous co-planar visual vehicular wheel design including an anti-theft feature comprising a cover plate that blocks access to the lug bolts of a wheel while sealingly preventing migration of oil and other substances from the center to the exterior thereof and which is held in place by a wedge-shaped, threadedly received central shaft member having a multi-sided faceted configuration which can only be removed in a facilitated manner by engagement and rotation through a specifically shaped conforming tool.

17 Claims, 3 Drawing Sheets

MOTOR VEHICLE WHEEL CENTER INCLUDING AN ANTI-THEFT FEATURE

Matter enclosed in heavy brackets [ ] appears in the original patent but forms no part of this reissue specification; matter printed in italics indicates the additions made by reissue.

BACKGROUND OF THE INVENTION

The present invention relates generally to motor vehicle wheels and in particularly to an improved motor wheel vehicle wheel center apparatus for attachment to the vehicle at the axle hub by the axle lug bolts of the vehicle and which includes anti-theft features associated therewith.

Various devices currently exist that attempt to combine an aesthetically pleasing appearance with theft deterrence or prevention means, in connection with automotive vehicle wheels. For example, found on some French passenger cars is a wheel having a spoke disk or plate stamped out of sheet steel and affixed at its center by a tapped hole receiving the head of a fastening part designed as a screw made hexagonally on its outside and sized to match the dimensions of the axle bolt fastening nuts used to attach the wheel to the axle. Through such a conventional design, the screw part on the French device could be opened at any time by means of a standard wrench and the hub cap thereby easily removed to expose access to the vehicle lug nuts. Such lug-covering hub caps have accordingly failed to sufficiently protect against theft.

Also, in this well known design, only the outer edge of the hub cap was pressed against the spoke disk. Therefore if oil or greased leaked at the grease cap of the wheel axle, (which cannot be avoided entirely,) through rotation of the wheel, such substances would eventually be thrown against first the fastening nuts and eventually through the edge gap between the hub cap and the spoke disk and onto the exterior thereof. Since this contact zone between spoke disk and hub cap was located relatively far away from the center of the axle, it could never be made completely tight, so that the traces of oil leaking outwardly together with dirt carried thereby, would frequently cause a dripping action which would be very hard to remove.

In addition, the penetration of dirty water and the like from the outside of the wheel towards the inside grease cap could not be prevented either, so that the effect would be a virtual circulation system in which a mixture of dirt, water and oil would be thrown from the axle or hub zone radially outward and later replenished.

Many well-known spoke disk wheel designs are additionally very limited with respect to optically attractive designs. Therefore, one increasingly goes to casting spoke disks of lighter metals such as aluminum alloy.

Other wheel designs such as the "Remotec" wheel, have included a hub cap that entirely covers the lug nuts of the wheel that made as a continuous one-piece part which is clipped to the spoke disk by means of a conventional lock connection. However, such a lock-type connection design results in the locks being exposed to, among other things, the elements and affects the visual appearance of the wheel by interrupting the continuous transition from wheel design to cover plate design.

Also in existence are wheel designs such as ones by Remotec, incorporating supposed anti-theft features consisting of a center locking cap which can be opened only with a special key, while allowing the axle lug bolts of the wheel to be only partially exposed therethrough, so as to prevent sufficient access to a conventional wrench or other similar tool to remove the bolts without first unlocking the protective center cap. However, such designs likewise not only adversely affect the visual appearance of the exterior of the wheel, but do not fully protect the aforementioned lug bolts from tampering or other damage and do not seal portions of the wheel from oil and dirt imigration.

Automotive wheel devices also exist such as Lyon, U.S. Pat. No. 2,911,260 which prevents removal of the wheel cover and corresponding access to the lug bolts without the use of a key to unlock the conventional lock mechanism. In Lyon, the locks keep the "knock off" or "spinner" decorative center of the wheel locked to a bracket affixed to the wheel by the lug nuts, near the grease cap of the axle. Similarly, Hudson U.S. Pat. No. 3,995,461 employs a lock mechanism built into a wheel cover which engages a mechanism attached to the wheel, surrounding the grease cap of the axle, so as to block access to the lug bolts unless the key unlocks the plug lock to allow removal of the cover. However, the aforementioned designs provide neither an aesthetically pleasing continuous transition in design appearance between the caps and the wheel, nor a very secure means of affixation.

Lamme, U.S. Pat. No. 3,170,733 employs a wheel cover that is affixed to the wheel by employing a "spinner" which is threadedly received by a bracket surrounding the grease cap of the axle and secured by the lug nuts. The "spinner" is then positively locked by turning of a key, which when inserted in a conventional cylindrical lock, causes a protrusion to be received by a slot in the bracket. The necessary exposure of the conventional lock mechanism of the '733 device could cause not only the previously described aesthetic and security problems encountered with standard lock and key mechanisms, but also, potentially the operational difficulties often encountered when such mechanisms are exposed to the environment.

Scruggs, U.S. Pat. No. 4,083,606 addresses the common problem in a multi-part wheel cover assembly, of preventing undesired rotation of the locking device relative to the wheel cover by providing a pin extending from the cap member through the wheel cover to prevent rotative removal of the wheel cover from the wheel. A conventional lock is also provided to protect the wheel cover and the wheel itself from being easily removed from the vehicle. Similarly, Goeske U.S. Pat. No. 2,282,222 employs a series of corresponding pegs and holes as well as conventional locking mechanisms to maintain its hub cap securely held against theft, under "lock and key." But the same problems could potentially exist with respect to the Goeske device as the previously discussed conventionally locking prior devices.

Reppert, U.S. Pat. No. 4,067,621, employs a two-piece hub cap construction joined by means of a screw thread connection and using a "ratchet" locking system which is releasable by reaching behind the hub cap and either pulling or pushing on the lever to release the ratchet lock and allow unscrewing of the outer cup, thereby exposing the lug nuts of the wheel. Such a construction could present difficulty, if removal of the hub cab is desired, while not providing a sufficient impediment to unauthorized removal thereof.

Clearly, there is therefore a need for an improved motor vehicle wheel center apparatus which promotes a completely integrated continuous appearance between "outer" wheel and "inner" cover plate while providing an anti-theft feature in an overall construction which precludes undesirable migration of oil and dirt.

Consequently the present invention has as an object the accomplishing of the dual purposes of providing for an especially attractive aesthetic design for a motor vehicle wheel, and preventing theft thereof by impeding or preventing undesired access to the axle lug bolts thereof.

In addition, the present invention has as an object, the secure affixation of the hub cap member, and specifically, the cover plate and shaft member, to the spoke disk and prevention of easy removal by unauthorized persons.

It is a further object of the present invention to provide a spoke disk member and a hub cap member which are designed to attach in a visually attractive continuous design manner.

It is yet another object of the present invention to provide for secure fastening of the hub cap member to the spoke disk member to prevent undesired relative movement thereof and corresponding alteration of the visual design of the wheel center when in the assembled relation.

Another object of the present invention is to provide for especially effective sealing between the hub cap member and the spoke disk, to prevent undesired migration of materials either into or from the center of the axle to the exterior of the wheel or the lug nuts.

It is yet another object of the present invention to provide for increased friction-tightness between the hub cap member and the spoke disk member including utilization of the wedge principal to increase the reliability of the connection.

It is yet a further object of the present invention to provide for a collecting space in the spoke disk member for dirt which might otherwise penetrate to or from the outside of the wheel.

Another object of the present invention is to prevent contact corrosion between the component parts of the apparatus while still maintaining an economically feasible mode of production.

Yet another object of the present invention is to provide for a hub cap member which can be, on the one hand mounted and demounted by means of a special wrench or tool, and on the other hand be of such a configuration that commonly available tools or keys do not facilitate such unauthorized removal.

A further object of the present invention is to provide for consistant alignment of the spoke disk member and cover disks in a predetermined rotary position relative to each other, so that the pattern present in the spoke disk member can be continuously displayed on the outside of the cover plate.

It is yet another object of the present invention to provide for a means of secure attachment of a cover plate which avoids the problems encountered with conventional locking mechanisms which are exposed to the environment including the potential problems of rusting, freezing, or the existence of "universal" keys.

Yet another object of the present invention is to provide a more simplified wheel center construction incorporating the advantages of production from light metals as well as metal to plastic interfacing and integration.

These and other objects of the invention will become apparent in light of the present specification and drawings.

SUMMARY OF THE INVENTION

The improved motor vehicle wheel center apparatus comprises a spoke disk member, having a central bore aligned coaxially with respect to the axis of rotation of the wheel. In addition, a plurality of co-axially positioned passage holes are formed around the periphery of the central bore and are provided to allow for the passage of the motor vehicle lug bolts therethrough for fastening by the corresponding lug nuts to the axle hub of the motor vehicle. Also included is a hub cap member consisting of a cover plate having a central aperture and a shaft member passing therethrough. The cover plate is thereby maintained interposed between the shaft member and the spoke disk member and rests within a correspondingly shaped recessed surface on the spoke disk member. The hub cap member is demountably attached to the exterior of the spoke disk member so that the cover plate interposed therebetween will serve as a visual obstruction to, as well as impede or prevent undesired access to, the lug nuts and bolts and corresponding unauthorized removal or theft thereof.

Theft prevention means are also operably associated and corresponding with the spoke disk member in order to impede or prevent undesired removal of the hub cap member from the spoke disk member and corresponding exposure of the lug nuts and bolts. Alignment means are also operably associated with the cover plate and the spoke disk member to allow consistent alignment thereof. Moreover, sealing is provided proximate the central aperture and between the hub cap member and the spoke disk to prevent migration of substances therebetween and possibly to the outer face of the cover plate or spoke disk. Each of the spoke disk member and the cover plate bear respective alignable portions of a single discrete ornamental design which is capable of being manifested substantially continuously across both in a substantially common plane, while the cover plate is co-axially and restrainable interposed between the shaft member and the spoke disk member.

The shaft member of the hub cap member in the preferred embodiment comprises an outer cup-shaped member formed from an aluminum alloy-type material and an inner sleeve coupling member of an elastomeric material including the hub cap attachment means for removable attachment to the corresponding hub cap attachment means possessed by the spoke disk member. The outer cup-shaped member and the inner sleeve can be either interference fitted to one another or glued. The outer cup-shaped member further includes a co-axially positioned outer recessed portion for restrainable telescopic receipt of a decorative hub ornament. Furthermore, the central formed core is a tapped hole through the spoke disk member capable of accurately receiving and holding the shaft member with the cover plate being interposed therebetween.

The hub cap is attached to the spoke disk in the following manner. The sleeve coupling member has a male threaded portion which is accurately received by a corresponding female threaded portion formed in the spoke disk central bore, so as to result in the cover plate becoming interposed therebetween. In addition, at least the male threads on the sleeve coupling member are angled outwards, while in the preferred embodiment the female threaded interior wall portion of the central bore is correspondingly angled so as to result in a conical wedging effect and improved fastening restraint therebetween.

The theft prevention means include the outer cup-shaped member having a non-standardized multi-sided peripheral configuration requiring alignment with or gripping by a shape-conforming tool for removal of the hub cap member and corresponding exposure of the lug nuts. The multi-sided peripheral configuration of the cup-shaped member can be either a plurality of curved sections or facets, straight sections or facets, or any combination thereof.

The aforementioned alignment means comprise a pin member operably affixed to and protruding from the cover plate and a correspondingly shaped and positioned bore designed to receive the pin, formed within the spoke disk member. The pin member and bore cooperate to enable consistent relative positioning of the cover plate upon the spoke disk member to maintain the virtually continuous exterior appearance.

The alignment means can also comprise a stop cam member protruding from the spoke disk member and a countercam protruding from the back of the cover plate and positioned to contact the stop cam member on at least one side when the cover plate and spoke disk member are properly aligned. Such engagement of the stop cam and countercam also serves to prevent mutual relative turning therebetween.

The plurality of sealing means include the shaft member having a cone-shaped bearing surface and the cover plate having a correspondingly shaped bevel seat portion. Furthermore, the cone-shaped bearing surface contacts the correspondingly shaped bevel seat portion when the hub cap member is tightened onto the spoke disk member. The attachment of the hub cap member to the spoke disk member serves to bring the shaft member into contact with the cover plate, and in turn the spoke disk member, so as to form a substantially fluid-tight seal to prevent migration of substances from the central greases cap area to the exterior of the wheel or vice versa. Sealing against migration of fluids substances to the exterior of the wheel is further accomplished by the threaded mated attachment of the shaft member to the central bore of the spoke disk member, contact between the planar surface of the hub cap member radial flange and the correspondingly oppositely positioned counterplane surface of the cover plate, as well as contact between the cover plate cylindrical extension and spoke disk cylindrical recess, when the hub cap member is affixed to the spoke disk.

The spoke disk and cover plate in the preferred embodiment are made out of an aluminum alloy-type material while the shaft member inner sleeve coupling member is formed of plastic. However, the cover plate could also, in an alternative embodiment be formed of plastic. More specifically, the shaft member thread first end or inner sleeve coupling member, in the preferred embodiment, is formed of plastic while the second end or head is operably affixed to a cup-shaped member formed from an aluminum alloy-type material. The shaft member second end also has a head having a multi-sided or faceted peripheral configuration. In the preferred embodiment the multi-sided peripheral configuration is composed of a plurality of substantially straight or planar surfaces, but can also be composed of a plurality of curved sections. The multi-sided cup shaped member is interference fitted or glued over the correspondingly multi-sided head of the shaft member so as to be in nested relation thereby allowing the unitary turning of the shaft member when a tool engages the shaft member and torque is applied to the multi-sided cup.

In the preferred embodiment, the substantially continuous visual appearance of the exterior of the spoke disk member is of a lattice-like or simulated spoke pattern.

BRIEF DESCRIPITION OF THE DRAWINGS

DETAILED DESCRIPTION OF THE DRAWINGS

Figure 1:
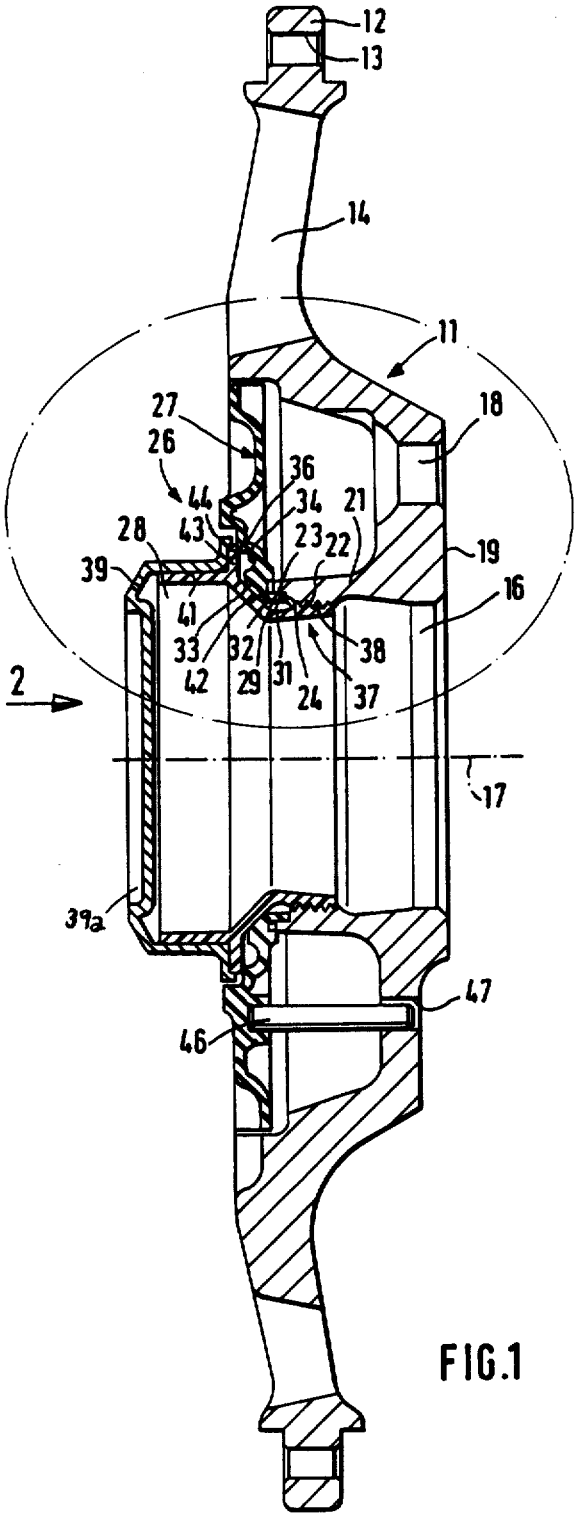
FIG. 1 is a cross-sectional view of the spoke disk member of the improved motor vehicle wheel center apparatus showing the hub cap member including the shaft member and cover plate being attached thereto.

While this invention is susceptible of embodiment of many different forms, it is shown in the drawings and will herein be described in detail, two specific embodiments with the understanding that the present disclosure is to be considered as an exemplification of the principle of the invention. It is not intended to limit the invention to the embodiments illustrated.

Figure 2:
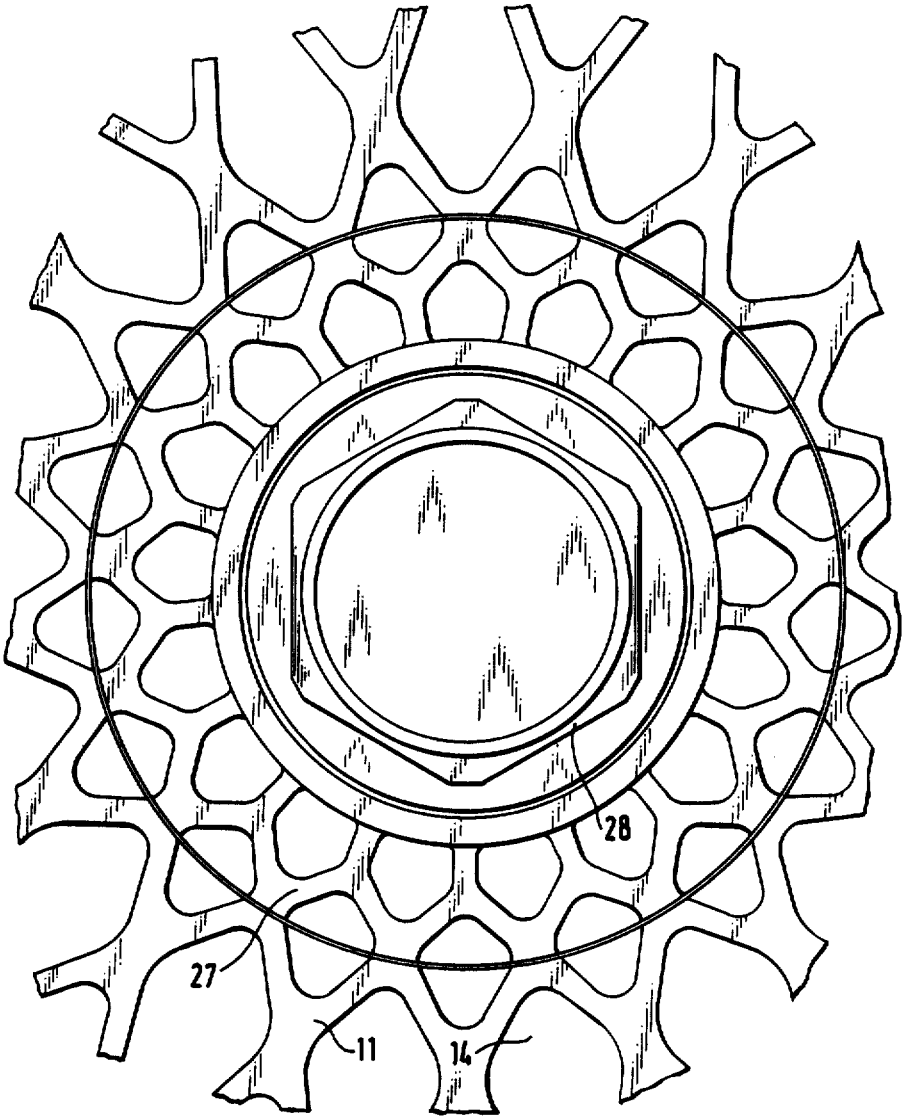
FIG. 2 is a partial front elevational view of the spoke disk showing the cover plate and shaft member in assembled fashion and resulting in a virtually continuous visual impression.
Figure 3:
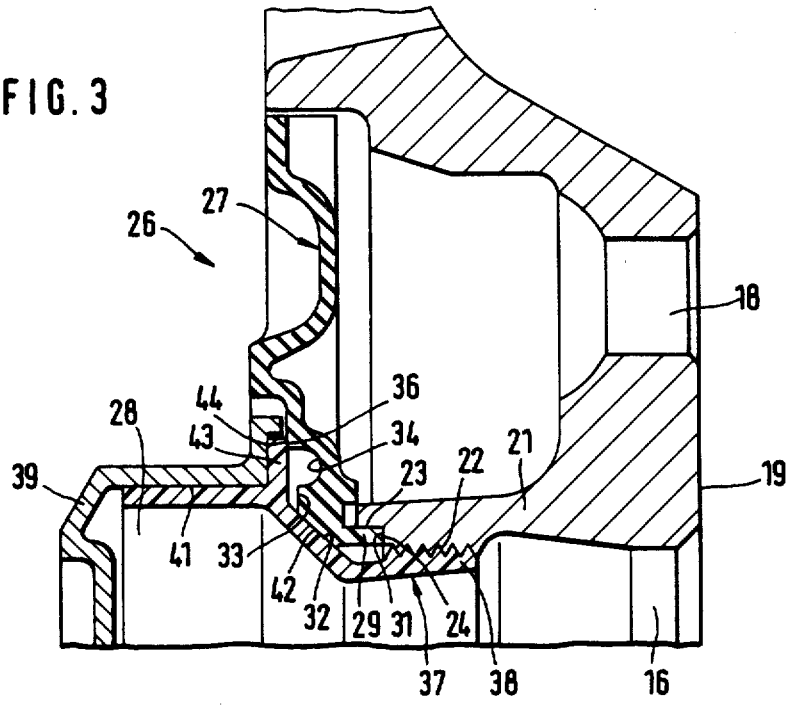
FIG. 3 is an enlarged partial cross-sectional view of the spoke disk member as shown in FIG. 1, showing in particular, the shaft member and cover plate in attached relation thereto.

As shown in FIG. 1 with respect to the first embodiment of the present invention, spoke disk 11 is approximately plate-shaped. On the outer edge of spoke disk 11 are a plurality of holes 13, which in a commonly known matter not described herein, are employed to connect the spoke disk 11 to the other rim parts (not shown) so as to comprise a motor vehicle wheel. A preferred embodiment of spoke disk member 11 as shown in FIGS. 1 through 3, has along its outer peripheral zone a multitude of voids or interruptions 14 which give it a simulated spoke-like or lattice-like appearance. In the center of spoke disk 11 is shown a central hole 16 aligned co-axially to vehicle wheel axis of rotation 17. Center hole 16 serves as an opening to receive the grease cap ordinarily found on the end of motor vehicle axles. Axle bolt passage hole 18 is one of a series of several such passage holes which are positioned co-axially with respect to axis of rotation 17 allowing screw bolts (not shown) of the motor vehicle axle to pass therethrough. Inner side 19 of spoke disk 11, when mounted on the axle points in the direction of the axle. Fastening nuts (not shown) are then tighted onto the screw bolts passing through passage holes 18 so as to restrainably fasten the spoke disk 11, and correspondingly the rim to which it is attached, to the axle hub.

In its center, spoke disk 11 is provided with sleeve-like extension 21 surrounding center hole 16 and comprising a tapped hole portion 22 and cylindrical recessed portion 23. The center hole 16 in the preferred embodiment has at its narrowest place a diameter of approximately 71 mm. and extends in the axial direction over a length of approximately 26 mm. The tapped hole 22 has a diameter of about 70 mm. and extends in the axial direction over a length of about 10 mm., in the preferred embodiment. Correspondingly, outer thread 38 of shaft member 28 extends in the axial direction over a length of about 10 mm. in the preferred embodiment. Cylindrical recess 23 serves to create a step-like counter-surface 24. In turn, the annular surface 31 countersurface 24 ranges from an inside diameter of approximately 72.5 mm. to an outside diameter of approximately 77 millimeters. Cylindrical recess 23 extends in the axial direction for a length of approximately 3 mm., while cylindrical extension 29 extends over an axial length of more than 3 mm. in the preferred embodiment.

Hub cap member 26, as shown in FIG. 1 when assembled, has a diameter large enough to cover at least the axial bolt passage holes 18. Hub cap member 26 also has at least a two-part construction consisting of a cover plate 27 having a central aperture and a shaft member 28 passing therethrough. Cover plate 27 has a cylindrical extension 29 protruding in the axial direction and whose front face forms an annular surface 31 which bears on countersurface 24. In the preferred embodiment, the extension 29 has an outside diameter of approximately 77 mm. and thereby fits accurately into cylindrical recess 23. Outside and opposite annular surface 31, cover plate 27 is further provided with a bevel seat 32 which ranges from an inside diameter in the preferred embodiment of about 69–72.5 mm. to an outside diameter of approximately 80–82 mm. with an angle of taper of approximately 45 degrees. Cone-shaped shell element 42 is correspondingly shaped and sized in the preferred embodiment. Bevel seat 32 is followed radially outward by a transition surface 33, which is in turn followed by annular groove 34 directed inwardly. Annular groove 34 serves to collect dirt and other similar materials that would otherwise either adhere to the exterior of the wheel or migrate to its interior. Annular groove 34 is then followed by counterplane surface 36. Counterplane 36 and transition surface 33 are shifted relative to each other by about 1 mm. in the axial direction in the preferred embodiment.

Shaft member 28 is made in two parts in the preferred embodiment, with inner sleeve coupling member 37 being made of plastic and its first end carrying outer threaded portion 38 which corresponds to tapped hole 22. Threaded portion 38 of shaft member 28 is angled outwards. In the preferred embodiment, the threaded portion of central bore tapped hole 22 has correspondingly tapered interior threaded walls. The conical wedging resulting from the angling or tapering of the threads provide improved fastening restraint therebetween. The opposite end of sleeve coupling member 37 has the head 41 of shaft member 28 and is provided with a multi-sided configuration in the preferred embodiment, corresponding to the configuration of cup 39. The cup 39 and head 41 are connected to each other by interference fit and/or gluing by overlapping of the corresponding faces of each in nested fashion. Outer cup-shaped member 39 and head 41 are provided with the foregoing corresponding multi-sided configurations so as to permit both gripping of cup 39 and rotation of cup 39 and head 41 as a unit when desired, so as to permit removal of shaft member 28 and in turn cover plate 27, thereby providing access to the interior of spoke disk 11 and in particular the axial bolts positioned at passage holes 18. Cup-shaped member 39 is further provided with a co-axially positioned outer recessed portion for restrainable telescopic receipt of a decorative hub ornament or the like.

Proximate outer thread 38 of shaft member first end 37, cone-shaped shell bearing surface element 42 is provided, which as previously explained corresponds to bevel seat 32 and ranges from an inside diameter of approximately 68 mm. to an outside diameter of approximately 82 mm. The larger diameter end of shell 42 is followed by radial flange 43 which forms on its outer edge, an annular plane surface 44 which bears on counterplane surface 36. Because of annular groove 34 and the curvature of cover plate 27 proximate thereto, counterplane surface 36 can be somewhat elastic relative to bevel seat 32, so that a sealing effect may be maintained between the plane surface 44 and the counterplane surface 36. In the preferred embodiment, counterplane surface 36 and transition surface 33 are shifted by about 2 mm. relative to each other in the axial direction.

Also, in the preferred embodiment, plane surface 44 and counterplane surface 36 range from an inside diameter of 97 mm. to an outside diameter of 99 mm.

As shaft member 28 is screwed into the tapped hole 22 by means of outer thread 38, cone-shaped shell 42 presses wedge-like against the bevel seat 32 so that the cover plate 27, is somewhat widened near the cylindrical extension 29. Moreover, the outer periphery of the cylindrical extension 29 is pressed against the adjacent inside wall of recess 23, and as a result of the axial tension component, the annular surface 31 is simultaneously pressed against the counter-surface 24. This results in a significant sealing effect with cover plate 27 being fixed onto spoke disk 11 with a high degree of frictional engagement. Securing of the aforementioned positioning and sealing effect is also increased by the wedge effect existing between the cone shaped shell surface 42 and bevel seat 32.

It should likewise be noted that the tension force due to the outwardly biased shaft member 28 is transferred without radial shifting, since the contact place between the cone-shaped shell 42 and the bevel seat 32 is about the same radial distance as the contact zone between the annular surface 21 and the counter surface 24. Because of the large diameter of the tapped hole 22, thread engagement is sufficiently loadable and thus is able to absorb very large tensional forces. The sealing in the zone between the plane surface 44 and the counterplane surface 36 further acts as additional sealing and prevents the penetration of dirt to the sealing surface proper, in the zone of the cone-shaped shell 42, thereby reducing the threat of damage thereto by penetrating dirt that could cause grooves during the affixation process.

In the preferred embodiment, the multi-sided cup 39 of shaft member 28 is made of an aluminum-type alloy. Thus shaft member 28 can be mounted and demounted through the use of a special wrench conforming to the outer configuration thereof. It is contemplated that such a special wrench fitting the outer many-sided configuration of shaft member 28, not be readily available so as to prevent demounting of the hub cap member 26 and access to the axle bolts for the purpose of removal of the motor vehicle wheel by unauthorized persons.

As shown in FIG. 2 cover plate 27 serves to continue the pattern of spoke disk 11 so as to provide a virtually continuous visual appearance to the center of the motor vehicle wheel, in the case of a preferred embodiment, a lattice or simulated spoke-like design. So as to insure that the pattern will so appear virtually continuously, though the wheel may be assembled and disassembled, as shown in FIG. 1 there is anchored on the cover plate 27 a pin 46 which protrudes therefrom approximately parallel to the axis of rotation 17 and shifted radially outward from it so as to fit into a corresponding bore 47 formed within spoke disk member 11. Hence, such a corresponding pin 46 and bore 47 construction will prevent assembly of the spoke disk member 11, cover plate 27 and shaft member 28 in any manner other than one which gives a virtually continuous visual appearance to the design on the exterior of the spoke disk member 11 and cover plate 27.

Spoke disk 11 and cover plate 27 in the preferred embodiment are made out of an aluminum-type alloy, as is multi-sided cup 39. However, shaft member inner sleeve coupling member 37 and head 41 are expediently made of plastic, which because of its shape, is more favorable as a material with respect to production technique and sealing against the migration of undesired materials, as well as avoiding the need for bushings and such that would ordinarily be required in a metal to metal contact fitting situation.

Outer edge of cover plate 27 does not touch spoke disk member 11 so that water or other liquids that could possible be present in the hollow space located therein can get out. Because of the previously described significant sealing in the interior of the wheel near its center, oil will not be able to migrate from the center or axial and appear on the exterior of the cover plate 27 as a soiling factor.

In the preferred embodiment, cover plate 27 serves primarily as an optical oclusion as well as to prevent physical access to the axial bolts which would permit removal of the motor vehicle wheel from the axial. However, it is also contemplated to be within the scope of this invention that cover disk 27 be fashioned so as to alternatively also function as a ventilator.

Figure 4:
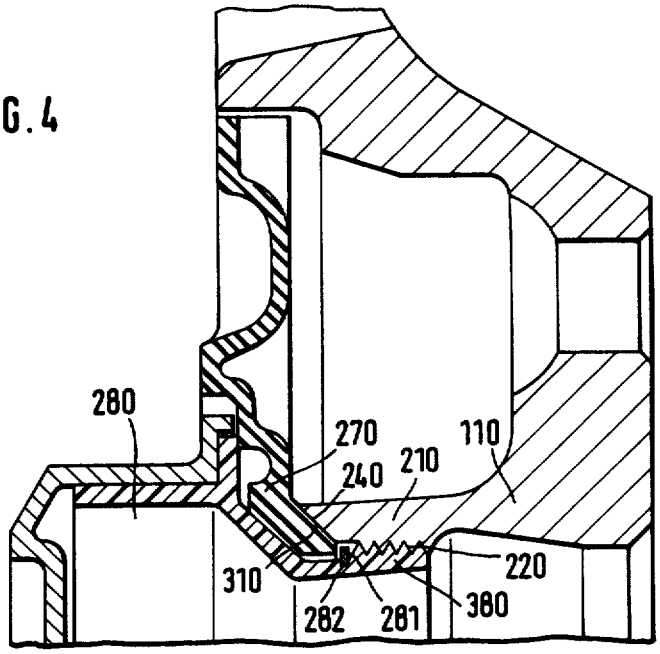
FIG. 4 is a partial cross-sectional view of a second embodiment of the improved wheel center apparatus showing in particular the shaft member, cover plate and spring member attached to the spoke disk member.

The second embodiment of the present invention shown in FIG. 4 is very similar to the embodiment previously discussed in connection with FIGS. 1 and 3, however, the zone of contact between cover plate 27 and spoke disk member 11 is somewhat modified. (The reference numerals of corresponding parts from the embodiment described in FIGS. 1 and 3 have been multiplied by a factor of 10 with respect to FIG. 4.) Specifically, following the tapped hole 220 of spoke disk member 110, a countersurface 240 is designed as a bevel seat of the sleeve-like extension 210. Annular surface 310 of the cover plate 270 fits it firmly. In contrast to the embodiment described in FIG. 3, some sharp-edged transitions are therefore avoided. FIG. 4 further shows spring ring 281 which is held in groove 282 interposed between cover plate 270 and threads 380 of the shaft member 280. By this arrangement, the shaft member 280 and the cover plate 270 are connected with each other so as to reduce the risk that one or the other will be separated and lost.

It should be further noted that also contemplated within the scope of this invention are embodiments wherein the many-sided outer configuration of shaft member 28 are comprised of several curved surfaces or a combination of planar and curved surfaces, as opposed to the polygonal planar surfaces shown herein with respect to the preferred embodiment. For example, the multi-sided shaft member can have an epicycloid or hypocycloid shape. Furthermore, instead of the corresponding pin 46 and bore 47 shown in FIG. 1, a radially protruding stop cam can be firmly formed onto extension 21 or elsewhere on spoke disk member 11 against which a counter-cam formed on the cover plate 27 can be put. Moreover, where cover plate 27 is designed to also serve as a ventilator, it is especially recommended to design the counter-cam in such a way that it extends past the stop cam in order to block turning of the cover plate 27 with respect to spoke disk 11 in both directions. Employing the stop-cam type of alignment structure results in a variation that can resist higher loads of rotation of the cover plate 27 with respect to the spoke disk member 11 as would be required when cover plate 27 is fashioned as a ventilator.

The cup 39 of shaft member 28 can be sufficiently large and designed in a visually attractive manner. Of course, a standard tool could not be used on this shaft member 28 so that unauthorized removal is made more difficult. Especially effective sealing is provided between shaft member 28, cover plate 27 and spoke disk 11. Moreover, the friction-tightness is further increased by utilization of the wedgelike configuration thereof and outward slanting of threads 38 of shaft member 28 thereby increasing the reliability of the connection. Moreover, a collecting space for dirt which might otherwise penetrate from the outside of the wheel to the interior of the axle is formed by annular groove 34. Because of groove 34, counterplane surface 36 is held elastically opposite the cone-shaped shell surface 42 which is rigidly threadedly received by tapped hole 22.

The pairing of materials of aluminum-type alloy for spoke disk member 11 and cover plate 27 as well as plastic for inner coupling sleeve member 37 aids in preventing contact corrosion. Contact corrosion is also prevented while providing an economical manner of production, by making cup 39 out of aluminum alloy while making the remainder of shaft member 28 out of plastic. However, it is contemplated as being within the scope of this invention to make cover plate 27 alternatively out of plastic.

The relatively large diameter of tapped hole 22, allows it to be formed directly in the spoke disk 11 made of a light metal, thereby simplifying the normal production technique since no separate metal insert is required for it. Moreover the large diameter of tapped hole 22 allows pressing of cover plate 27 against the spoke disk 11 directly in the zone surrounding tapped hole 22, because of the correspondingly large contact area thereat.

While the foregoing has presented two specific embodiments of the present invention, it is to be understood that such embodiments are presented by way of example only, and are [only] *not* intended to limit the invention. It is expected that others will [proceed] *perceive* variations which while differing from the foregoing do not depart from the spirit and scope of the invention as herein described and claimed.

What is claimed is:

1. An improved motor vehicle wheel center apparatus for attachment to the lug bolts of a vehicle axle and including an anti-theft feature associated therewith, said apparatus comprising:

a spoke disk member;

said spoke disk member having a central bore aligned co-axially with respect to the axis of rotation of said wheel;

a plurality of co-axially positioned passage holes formed about the periphery of said central bore and provided to allow for the aligned passage therethrough of said lug bolts for the fastening of same thereabout by aligned corresponding lug nuts to in turn restrainably affix said spoke disk member to the axle wheel hub of said vehicle;

a hub cap member;

said hub cap member consisting of a cover plate having a central aperture and a shaft member passing therethrough;

said cover plate being operably co-axially maintained in a position interposed between said shaft member and said spoke disk member upon the outer surface of said spoke disk member at a position substantially correspondingly shaped to the innermost surface of said cover plate;

said shaft member being operably and removably attachable to the central bore of said spoke disk member through hub cap attachment means operably disposed about the periphery of said shaft member;

said hub cap member being so removably attachable to the outer surface of said spoke disk member to enable said cover plate to cover said lug nuts and bolts;

theft prevention means operably associated with said hub cap member so as to impede undesired removal of said hub cap member from its position about said spoke disk member and in turn impede unauthorized access to said lug nuts;

alignment means operably associated with said cover plate and said spoke disk member so as to maintain consistent restrained orientation and prevent relative rotation therebetween, and;

a plurality of sealing means operably positioned between said hub cap member and said spoke disk member to prevent migration of fluid substances therebetween.

2. The improved motor vehicle wheel center apparatus of claim 1 where each of said spoke disk member and said cover plate bear respective alignable portions of a single discrete ornamental design which is capable of manifestation substantially continuously across both in a substantially common plane while said cover plate is co-axially interposed between said shaft member and said spoke disk member.

3. The invention according to claim 2 wherein said substantially continuous co-planar single discrete ornamental design is that of a simulated spoke or lattice pattern.

4. The improved motor vehicle wheel center according to claim 1 wherein the shaft member further comprises:

an outer cup-shaped member formed from an aluminum alloy-type material; and an inner sleeve coupling member of an elastomeric material including said hub cap attachment means for removable attachment to said corresponding hub cap attachment means possessed by said spoke disk member.

5. The invention according to claim 4 wherein said outer cup-shaped member and said inner sleeve coupling member are bonded by an adhesive bond therebetween.

6. The invention according to claim 4 wherein said outer cup-shaped member includes a co-axially positioned outer recessed portion for restrainable telescopic receipt of a decorative hub ornament.

7. The invention according to claim 4 in which said hub cap attachment means comprises:

said inner sleeve coupling member having a male threaded portion proximate a first end;

said central bore of said spoke disk member having a female mated threaded portion capable of accurate aligned threaded receipt and holding of said shaft member with said cover plate being interposed therebetween;

said male threaded portion of said inner sleeve coupling member having a thread configuration which angles outwardly in a radial direction about the axis of rotation;

said female mated threaded portion of said central bore having a thread configuration which angles outwardly in like fashion to the thread configuration of said inner sleeve coupling member so as to enable conical wedging threaded affixation therebetween; and said conical wedging of said inner sleeve and said central aperture providing improved fastening restraint through increased frictional interference therebetween.

8. The invention according to claim 7 wherein one of said plurality of sealing means comprises the threadedly mated attachment of said male threaded portion of said shaft member to said female threaded portion along the central bore of said spoke disk member so as to prevent the migration of fluid substances thereat.

9. The invention according to claim 4 wherein said theft prevention means comprises said outer cup-shaped member having a non-standardized multi-sided, faceted peripheral configuration requiring alignment with a shape-conforming tool for removal of said hub cap member.

10. The invention according to claim 9 wherein said multi-sided peripheral configuration of said outer cup shaped member is composed of a plurality of substantially straight facet sections.

11. The invention according to claim 9 wherein said multi-sided peripheral configuration of said outer cup-shaped member is composed of a plurality of substantially curved facet sections.

12. The invention according to claim 4 wherein said outer cup-shaped member and said inner sleeve coupling member include portions of substantially equivalent faceted shape so as to enable interference friction fit and nesting therebetween.

13. The invention according to claim 1 wherein said alignment means comprises:

a pin member operably affixed to and protruding from said cover plate;

a correspondingly shaped and positioned bore formed within said spoke disk member; and said pin member and said bore telescopically cooperating to enable consistent relative positioning of said cover plate upon said spoke disk member and to resist relative rotation therebetween so as to maintain said virtually continuous exterior appearance.

14. The invention according to claim 1 wherein one of said plurality of sealing means comprises:

said shaft member having a cone-shaped bearing element;

said cover plate having a correspondingly shaped bevel seat portion along its interior periphery for continuous juxtaposition along the surface of said bearing element; and said cone-shaped bearing element surface contacting said correspondingly shaped bevel seat portion when said hub cap member is tightened on to said spoke disk member so as to prevent the migration of fluid substances thereat.

15. The invention according to claim 1 wherein one of said plurality of sealing means comprises:

said hub cap member having a radial flange about its interior periphery forming an annular planar surface along its front face; and said cover plate being provided with a correspondingly oppositely positioned counterplane surface so as to operably contact said annular planar surface of said hub cap member when said hub cap member is affixed to said spoke disk member to in turn prevent the migration of fluid substances therebetween said hub cap member and said cover plate.

16. The invention according to claim 15 in which said radial flange emanates from said shaft member.

17. The invention according to claim 1 wherein one of said plurality of sealing means comprises:

said spoke disk member having a cylindrical recess co-axial to and proximate said central bore including a countersurface and an adjacent inside wall;

said cover plate having a cylindrical extension capable of being telescopically and closely received within said cylindrical recess, said extension including an annular surface; and said cylindrical extension pressing against said inside wall of said recess and said annular surface correspondingly being pressed against said countersurface when said hub cap member is tightened on to said spoke disk member so as to prevent the migration of fluid substances therebetween.

* * * * *